United States Patent
Lesniak (10) Patent No.: US 12,155,151 B2
(45) Date of Patent: Nov. 26, 2024

(54) SOCKET ASSEMBLY WITH LOCKING MECHANISM ACTIVATED AFTER ROTATION OF THE FLAP

(71) Applicant: APTIV TECHNOLOGIES LIMITED, St. Michael (BB)

(72) Inventor: Pawel Lesniak, Tarnow (PL)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 356 days.

(21) Appl. No.: 17/874,560

(22) Filed: Jul. 27, 2022

(65) Prior Publication Data
US 2023/0031098 A1 Feb. 2, 2023

(30) Foreign Application Priority Data
Jul. 30, 2021 (EP) .................................. 21188823

(51) Int. Cl.
*H01R 13/52* (2006.01)
*B60L 53/16* (2019.01)
*H01R 27/02* (2006.01)

(52) U.S. Cl.
CPC .......... *H01R 13/5213* (2013.01); *B60L 53/16* (2019.02); *H01R 27/02* (2013.01); *H01R 2201/26* (2013.01)

(58) Field of Classification Search
CPC ............................ H01R 13/5213; H01R 27/02; H01R 2201/26; H01R 13/453; H01R 13/4532; B60L 53/16; B60K 2015/053; B60K 2015/0561; B60K 15/05; B60K 2015/0576; B60K 2015/0569; B60K 2015/0507; B60K 2015/0515; Y02T 10/70; Y02T 10/7072; Y02T 90/14
See application file for complete search history.

(56) References Cited

U.S. PATENT DOCUMENTS

| 10,259,315 | B2 | 4/2019 | Jobst et al. |
| 2011/0165787 | A1* | 7/2011 | Pfeiffer ................ H01R 13/625 439/310 |
| 2020/0031235 | A1 | 1/2020 | Song et al. |

FOREIGN PATENT DOCUMENTS

| AU | 2008100908 A4 | 10/2008 |
| CN | 108551022 A | 9/2018 |
| DE | 2850470 A1 | 5/1980 |
| DE | 102017102969 A1 | 8/2018 |
| DE | 102019110628 A1 | 10/2020 |

(Continued)

OTHER PUBLICATIONS

European Search Report for European Application No. 21188823.5 mailed Jan. 24, 2022.

*Primary Examiner* — Travis S Chambers
(74) *Attorney, Agent, or Firm* — Carlson, Gaskey & Olds, P.C.

(57) ABSTRACT

A socket assembly may include a socket for receiving a plug, a flap for covering the socket, wherein said flap is rotatable about a shaft between a closed position and an open position and is biased into the closed position, a locking mechanism that locks the flap in the open position, and a release mechanism that releases the locking mechanism, when a plug is inserted in the socket. After a release of the locking mechanism, the locking mechanism can be activated only after the flap has been rotated from the open position to the closed position to an extent of at least 30%.

16 Claims, 4 Drawing Sheets

(56) References Cited

FOREIGN PATENT DOCUMENTS

| | | | | |
|---|---|---|---|---|
| DE | 102019113036 | A1 | 11/2020 | |
| EP | 1544955 | A2 | 6/2005 | |
| EP | 3595095 | B1 * | 7/2020 | ......... H01R 13/4534 |
| EP | 3984800 | A1 | 4/2022 | |
| WO | 2020151886 | A1 | 7/2020 | |
| WO | WO-2024041692 | A1 * | 2/2024 | ............. B60K 15/05 |

* cited by examiner

SOCKET ASSEMBLY WITH LOCKING MECHANISM ACTIVATED AFTER ROTATION OF THE FLAP

CROSS-REFERENCE TO RELATED APPLICATIONS

This application claims priority to European Patent Application No. EP21188823.5 filed on Jul. 30, 2021.

TECHNICAL FIELD

The present disclosure relates to a socket assembly comprising a socket for receiving a plug and a flap for covering the socket.

BACKGROUND

Socket assemblies comprising flaps for covering a charging terminal are well known. In the closed position, the flap not only covers the charging terminal from an aesthetic point of view, but also protects the charging terminal from external influences, such as moisture or dirt.

A flap may not only be used to entirely cover the charging terminal but also to cover parts thereof. Such kind of configuration is of particular interest if the charging terminal comprises one socket for alternating current (AC) and one socket for direct current (DC). A flap may then be used to cover only one of the respective sockets. Alternatively, each of the charging terminals may be covered by separate flaps. In either case such kind of flap or flaps may be used in addition to a flap for entirely covering the charging terminal.

A well-known socket assembly to protect a DC socket of a charging terminal is for example an inactive DC flap. A user needs to open and close the flap manually by hand to cover or uncover the DC socket. Another example of an inactive socket assembly is covering the sockets by means of caps that are put-on the AC and/or the DC socket of a charging terminal manually by the user to protect the sockets. Furthermore, there are active closing flaps in use that may hold the flaps in the open position. A user needs to open the flap manually, but its closing is realized by a spring mechanism. In some cases, the flap is locked in the open position and must be released to close the flap. On the other hand, there are also known active opening flap systems where the flap comprises a release mechanism and a spring mechanism. The user has to push a hook on the release mechanism and the flap is opening by means of the spring mechanism. The closing of the flap has to be done manually by the user.

In order to reliably keep the flap particularly in the closed position, a mechanism may be provided that guarantees that the flap is in the closed position after charging. Inactive systems, as described above, are fault-prone since the user is responsible for opening and closing the flap or cap covering the socket. Thus, there is a risk that the user forgets to cover the socket after charging. Active closing flap systems, especially systems holding the flap in the open position, may also not reliably work after charging. After releasing the flap from the locked position, the user may unintentionally move the flap back to the open position during removal of a plug from the socket.

Therefore, there is a demand for a socket assembly that overcomes the above-mentioned drawbacks. In particular, there is a need to reliably cover the socket by means of a flap after charging.

These demands are satisfied by a socket assembly comprising the features of claim 1.

SUMMARY

The present disclosure provides a socket assembly according to the independent claim. Embodiments are given in the subclaims, the description and the drawings.

In one aspect, the present disclosure may be directed at a socket assembly, wherein the socket assembly comprises a socket for receiving a plug, a flap for covering the socket, wherein said flap is rotatable about a shaft between a closed position and an open position and is biased into the closed position, a locking mechanism that locks the flap in the open position, a release mechanism that releases the locking mechanism, when a plug is inserted in the socket, wherein after a release of the locking mechanism, the locking mechanism can be activated only after the flap has been rotated from the open position to the closed position to an extent of at least 30%.

The functionality of the socket assembly is based on the general idea that the flap should not retain in the open position after charging, when a user applies additional movement of the flap and brings the flap back to fully open position, for example during removal of the plug.

The socket may be a charging terminal or a part of a charging terminal, for example an inlet for charging with alternating current (AC) and/or an inlet for charging with direct current (DC). The sockets or inlets for AC or DC charging may be any kind of well-known sockets or inlets. The plug may be a charging plug for charging the vehicle via the socket and may also be any kind of an appropriate plug that fits in the socket. The charging terminal may be mounted on a battery electric vehicle (BEV) or a plug-in hybrid vehicle (PHEV) to charge a battery of the vehicle.

The charging terminal may be covered by a part of a body of the vehicle and additionally by at least one flap that is not part of the vehicle body. The flap covers at least one socket (an AC socket and/or a DC socket) of the charging terminal. The flap is rotatable about a shaft, wherein the shaft defines an axis and the shaft may be of a cylindrical structure. The flap is rotatable about the axis between a closed position and an open position. The closed position may be a position where the flap covers the socket to the full extent, i.e. the socket is protected from external influences, such as moisture or dirt. The closed position of the flap may be defined as a position where the angle of rotation about the shaft is zero degrees (0°). On the other hand, the open position may be a position where the socket is not covered by the flap, particularly where a plug can be inserted into the socket. The open position of the flap may be defined as a position where the angle of rotation about the shaft approaches at least ninety degrees (90°), or at least about one hundred degrees (100°), preferably about one hundred and ten degrees (110°). The flap is biased into the closed position by means of a spring. The spring may be tensioned when the flap is rotated from the closed position into the open position and the flap may move into the closed position by means of the spring if the flap is released from the open position. The locking mechanism locks or retains the flap in the open position when the flap has been brought in the open position. If the flap is locked by means of the locking mechanism, a rotation of the flap from the open position in the direction of the closed position may not be possible. The release mechanism releases the locking mechanism from the open position and the flap rotates from the open position into the closed position. Thereby, the user does not need to close the flap manually after charging, but the flap is closed automatically after the flap is released from the open position.

According to an embodiment, the release mechanism may comprise a shiftable activation pin that may release the locking mechanism when the plug is inserted in the socket, wherein the activation pin may be shiftable between an activation position and a release position, wherein the activation pin is in the activation position if the flap has been rotated from the open position to the closed position to an extent of at least 30%, wherein the activation pin is in the release position if a plug is inserted in the socket or the flap has been rotated from the open position to the closed position to an extent of less than 30%. By this means the release of the locking mechanism and thus, the release of the flap from the open position, occurs automatically when the plug is inserted in the socket. Also, a misuse or an unintended handling of the flap by the user is prevented, particularly if the user applies additional movement of the flap during plug removal and rotates the flap back into the open position. In such a case, the flap does not retain in the open position again, since the activation pin is still in the release position. Only when the flap has been closed to an extent of at least 30%, the activation pin shifts to the activation position and the flap can be locked again in the open position.

The activation pin may be shiftable in a plane that may be perpendicular to a plane where a plug is inserted into the socket. The activation pin may be linearly movable between the activation position and the release position. The activation position of the activation pin may be a position where the activation pin may extend into a part of the socket that receives the plug. The activation pin may be in the activation position if there is no plug received by the socket and the locking mechanism may be activated by the activation pin if the activation pin is in the activation position. The release position of the activation pin may be a position where the activation pin may not extend into a part of the socket that receives a plug. Particularly, the activation pin may be in the release position if a plug is completely inserted in the socket.

According to an embodiment, the activation pin may comprise a tilted surface to contact a plug, wherein the tilted surface may be contacted by the plug when the plug is inserted in the socket, wherein the activation pin may be shifted from the activation position into the release position when the plug is inserted in the socket. It has been found, that due to the tilted surface of the activation pin the plug may slide over the tilted surface and pushes the activation pin backwards without any interruptions during insertion of the plug in the socket.

The activation pin may be of a cuboid structure, wherein one side of the activation pin may be sloped to build the tilted surface of the activation pin. The tilted surface of the activation pin may extend into a part of the socket that receives a plug. The activation pin may be extended into the part of the socket such that the tilted surface of the activation pin may be in the direction to where a plug can be inserted in the socket. When a plug is inserted into the socket, the plug may contact the tilted surface of the activation pin and pushes back the activation pin. The activation pin may not extend into the part of the socket that receives the plug after the plug is inserted into the socket completely. In other words, inserting the plug into the socket may move the activation pin from the activation position into the release position of the activation pin by sliding the plug over the tilted surface of the activation pin.

According to an embodiment, the release mechanism may comprise a spring hook that may lock the activation pin in the release position. The spring hook may be of a double bended form wherein a bended part at one end of the spring hook may form a hook structure. The hook structure may lock the activation pin in the release position of the activation pin by retaining the activation pin such that the activation pin may not be moveable from the release position into the activation position. This leads to the effect that a further activation of the mechanism of the socket assembly as described herein, is only possible after the activation pin has been released from its release position.

According to an embodiment, the release mechanism may comprise a return spring that may shift the activation pin from the release position into the activation position. The return spring may be a coil spring or may be made up of a metal plate that has a bended form. The return spring may be tensioned when the activation pin shifts from the activation position into the release position. If the activation pin is released from the release position, the activation pin may be shifted from the release position into the activation position by means of the return spring. This means that the mechanism of the socket assembly as described herein returns to an initial condition after the activation pin has been shifted in the activation position.

According to an embodiment, the locking mechanism may comprise a spring hook that may lock the flap in the open position. It has been found, that locking the flap in the open position may guarantee a more comfortable handling for the user during the charging process. The spring hook may be of a double bended form wherein a bended part at one end of the spring hook may form a hook structure. The hook structure may lock the flap in the open position by retaining the flap such that the flap may not be moveable from the open position into the closed position. The locking mechanism may comprise the spring hook that locks the flap in the open position.

According to an embodiment, the socket assembly may further comprise a connector, wherein the connector may accommodate the shaft and may comprise a protrusion, wherein the protrusion may release the activation pin from the release position. The connector may be a connecting element that connects the flap with a base member. The connector may comprise a cylindrical retainer accommodating the shaft and the connector may be rotatable about the shaft when the flap rotates from the open position into the closed position or from the closed position into the open position. The connector may also accommodate the spring that is tensioned when the flap rotates from the closed position into the open position and the flap may close to the closed position by the spring if the flap is released from the open position. The spring may be a coil spring, wherein the spring may be hold by the shaft. The protrusion may be arranged at the cylindrical retainer and may be of a cuboid structure. The protrusion may release the activation pin from the release position of the activation pin. Besides the main function of the connector to connect the flap with a base member it may be possible with the connector to steer the position where the flap is locked in the open position and at which position the activation pin is released from its release position. Depending on the position of the protrusion on the connector, the protrusion may release sooner or later the activation pin from its release position and let the socket assembly return to its initial condition. Also, there is a cavity on the connector that receives the spring hook that locks the flap in the open position. Depending on the position of that cavity, the open position of the flap is determined.

According to an embodiment, the socket assembly may further comprise a base member, wherein the base member may accommodate the connector, the locking mechanism and the release mechanism, and wherein the base member may snap-fit in the socket. The base member may have a cuboid shape and may have cavities to accommodate the connector, the locking mechanism and the release mechanism. The base member may comprise a snap-fit, wherein the base member may snap or click in the socket by means of the snap-fit. It has to be found, that by means of the snap-fit an easy replacement of the base member from the socket may be possible.

According to an embodiment, the connector may couple the flap and the base member by means of the shaft. The connector may be hold by the shaft that is clamped in the base member into two circular cavities. The flap may be connected to the connector by means of pins on the connector that are plugged in appropriate retainers on the flap. The connection between the connector and the flap may be releasable. Therefore, for example, a replacement of a broken flap is possible without disassembling the socket assembly. Another benefit is to mount a disconnected flap to the connector again after the flap has been disconnected from the connector. This may happen after a misuse of the flap, for example, if the flap has been rotated beyond the open position.

According to an embodiment, the socket assembly may further comprise a spring member, wherein the spring member may comprise the spring hook that may lock the flap in the open position, the spring hook that may lock the activation pin in the release position, and the return spring, wherein the spring member may be of a cuboid structure, wherein the spring hooks and the return spring are dedicated to respectively one side of the cuboid structure. The spring member may be accommodated in a cavity of the base member. It has turned out, that assembling the spring hooks and the return spring by means of the spring member may lead to a simultaneous operation by means of the activation pin. It may also be possible that the return spring is an additional component, i.e. the spring member may not comprise the return spring. In this case, the return spring may be a compression spring that operates as described above. That means, the return spring may be tensioned when the activation pin shifts from the activation position into the release position. If the activation pin is released from the release position, the activation pin may be shifted from the release position into the activation position by means of the return spring. Thus, the production of the spring member may be simplified.

According to an embodiment, the spring member may enclose the activation pin. The activation pin may activate or move or push the spring member if the activation pin is shifted from the activation position into the release mechanism. The spring hook that locks the flap in the open position may be pushed back and release the flap from the open position if the activation pin pushes the spring member when the activation pin is pushed back by means of a plug from the activation position into the release position. Simultaneously, the spring hook that locks the activation pin in the release position may be pushed back and retain the activation pin in the release position if the activation pin pushes the spring member when the activation pin is pushed back by means of a plug from the activation position into the release position. Also, the return spring that shifts the activation pin from the release position into the activation position may be pushed back corresponding to the spring hooks and the return spring may be prestressed if the activation pin pushes the spring member when the activation pin is pushed back by means of a plug from the activation position into the release position. According to an embodiment, the flap and the connector may be releasably connected. This results in an easy replacement of the flap as described above.

According to an embodiment, the flap and the connector may be disconnected if the flap has been rotated from the closed position to the open position to an extent of at least 110%. A rotation beyond the open position, i.e. for example to an extent of at least 110%, may lead to a damage of the flap. The disconnection of the flap and the connector may preserve the flap to be damaged. The flap may be insertable into the connector after a disconnection. Neither the connector, nor the flap may be damaged if the flap has been disconnected from the connector. The angle of rotation about the shaft from the closed position into the open position of the flap may be about 110° and may be defined as 100%. The flap and the connector may be disconnected if the angle of rotation about the shaft may be at least 110%, i.e. if the flap has been rotated from the closed position to the open position to an extent of at least 110%.

According to an embodiment, the locking mechanism may be activated only after the flap has been rotated from the open position to the closed position to an extent of at least 50%, or at least 75%, or at least 90%.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
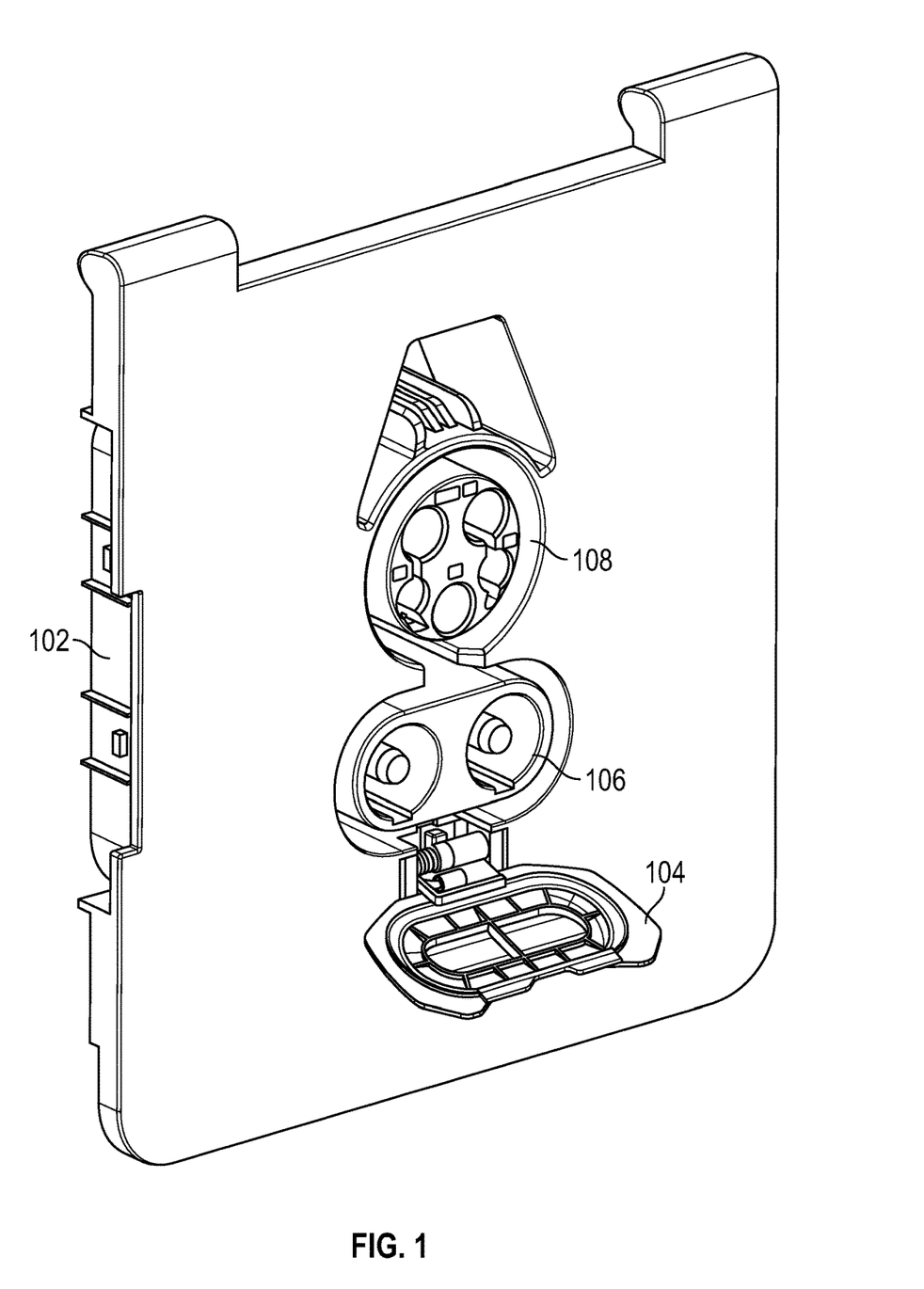
FIG. 1 is a perspective view of a charging terminal, comprising a socket assembly with a flap in an open position according to an embodiment of the present disclosure.

FIG. 1 depicts a perspective view of a charging terminal 100 comprising a socket assembly 102 with a flap 104 in an open position according to an embodiment of the present disclosure. The socket assembly 102 comprises a direct current (DC) charging socket 106 for charging with direct current and an alternating current (AC) charging socket 108 for charging with alternating current. FIG. 1 shows the flap 104 in an open position, prepared to receive a plug (not shown in FIG. 1).

The flap 104 covers the charging socket 106 in the closed position to protect the charging socket 106 against external influences, such as moisture or dirt. In contrast to that, an alternating current (AC) charging socket 108 is not provided with a flap 104. However, it is to be understood, that the AC charging socket 108 may also be provided with a correspondingly configured flap 104, or both, the DC charging socket 106 and the AC charging socket 108 may be covered with a correspondingly configured single flap.

Figure 2:
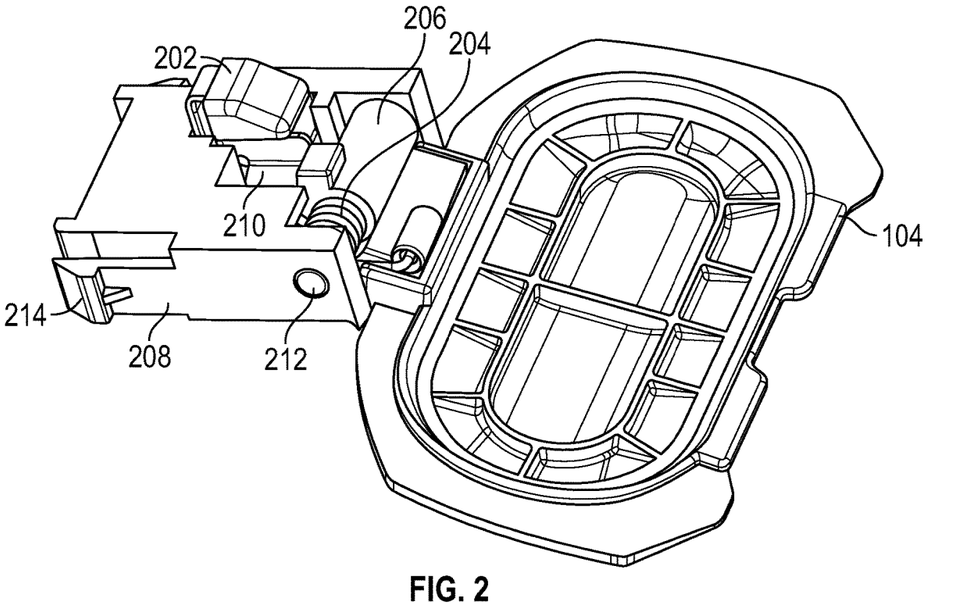
FIG. 2 is a perspective view of a socket assembly with the flap in an open position.

FIG. 2 shows a perspective view of the flap 104 in an open position according to the above embodiment of the present disclosure. The flap 104 is connected to a base member 208 by means of a connector 206. The connector 206 accommodates a shaft 212, wherein the shaft 212 retains the connector 206 at the base member 208. For this, the shaft 212 is pivotably mounted in circular cavities of the base member 208. The flap 104 is rotatable about the shaft 212 between a closed position and an open position. The flap 104 is biased into the closed position by means of a spring 204, wherein the spring 204 encloses the shaft 212. One end of the spring 204 is fixed with a part of the connector 206 that connects the flap 104 with the connector 206. The other end of the spring 204 is supported on the base member 208. The spring 204 is prestressed when the flap 104 rotates from the closed position into the open position and the flap 104 may move to the closed position by means of the spring 204 if the flap 104 is released from the open position. The base member comprises a snap-fit 214, wherein the base member 208 snaps into the socket assembly 102 by means of the snap-fit 214. The base member 208 further accommodates a spring member 210 and a shiftable activation pin 202, wherein the spring member 210 encloses the activation pin 202. The spring member 210 and the activation pin 202 are described in detail in the subsequent paragraphs.

Figure 3:
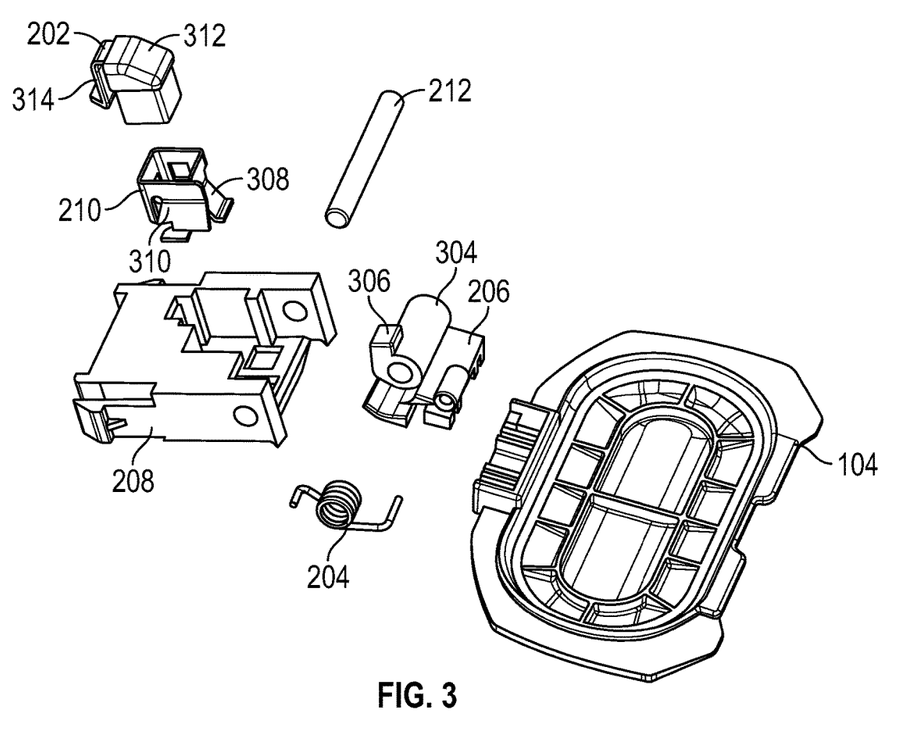
FIG. 3 is a perspective exploded view of a socket assembly.
Figure 4:
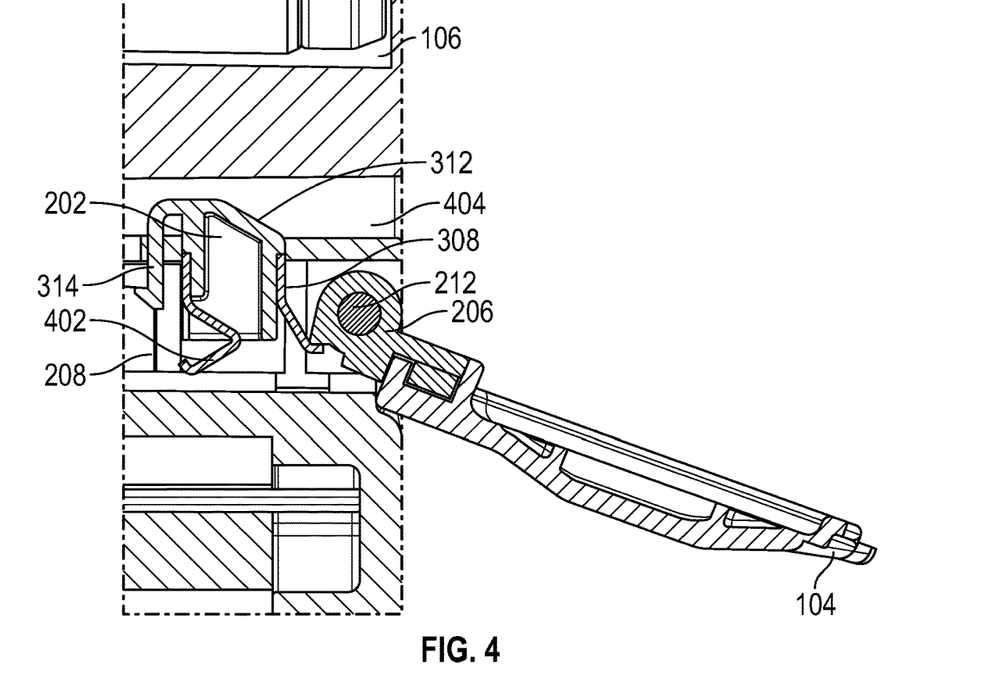
FIG. 4 is a cross-sectional side view of the socket assembly with the flap in an open position.

FIG. 3 shows a perspective exploded view of the socket assembly 102 according to the above embodiment of the present disclosure. The spring member 210 comprises a spring hook 308 that locks the flap 104 in the open position, a spring hook 310 that locks the activation pin 202 in a release position, and a return spring 402 (see FIGS. 4 and 5). The spring member 210 has a cuboid shape, wherein the spring hooks 308, 310 and the return spring 402 are located at respectively one side of the cuboid shape as shown in FIG. 3. The activation pin 202 also is of a cuboid structure, wherein one side of the activation pin 202 is sloped to build a tilted surface 312 of the activation pin 202. The tilted surface 312 contacts a plug 502 (see FIG. 5) when the plug 502 is inserted into the socket assembly 102 and the plug pushes the activation pin 202 back from an activation position (FIG. 4) into a release position (FIG. 5) of the activation pin 202. The activation pin 202 comprises a hook with a snap-fit 314, wherein the activation pin 202 snaps into the base member 208 by means of the snap-fit 314, as can be seen in FIG. 4. The connector 206 further comprises a cylindrical retainer 304 that accommodates the shaft 212 and a protrusion 306 that releases the activation pin 202 from a release position (see FIG. 7).

FIG. 4 to FIG. 7 illustrate the process of opening and closing the flap 104 of the socket assembly 102 in more detail. FIG. 4 shows a cross-sectional side view of the socket assembly 102 with the flap 104 in an open position. The flap 104 has to be opened manually from a user, i.e. the user has to rotate the flap 104 about the shaft 212 from the closed position into the open position. Once the flap 104 is in the open position, the flap 104 is locked by the spring hook 308 in the open position. Therefore, the spring hook 308 grabs into a cavity of the connector 206 (see FIG. 4). A rotation about the shaft 212 is prevented in the direction of the closed position by the spring hook 308. The activation pin 202 is in the activation position if there is no plug 502 inserted into the socket assembly 102. The activation position of the activation pin 202 is a position where the activation pin 202, particularly the tilted surface 312 of the activation pin 202, extends into a channel 404 of the socket assembly 102 that receives the plug 502. As described above, the activation pin 202 is hold by means of the snap-fit 314 in the base member 208 in the activation position and the return spring 402 is unstressed.

Figure 5:
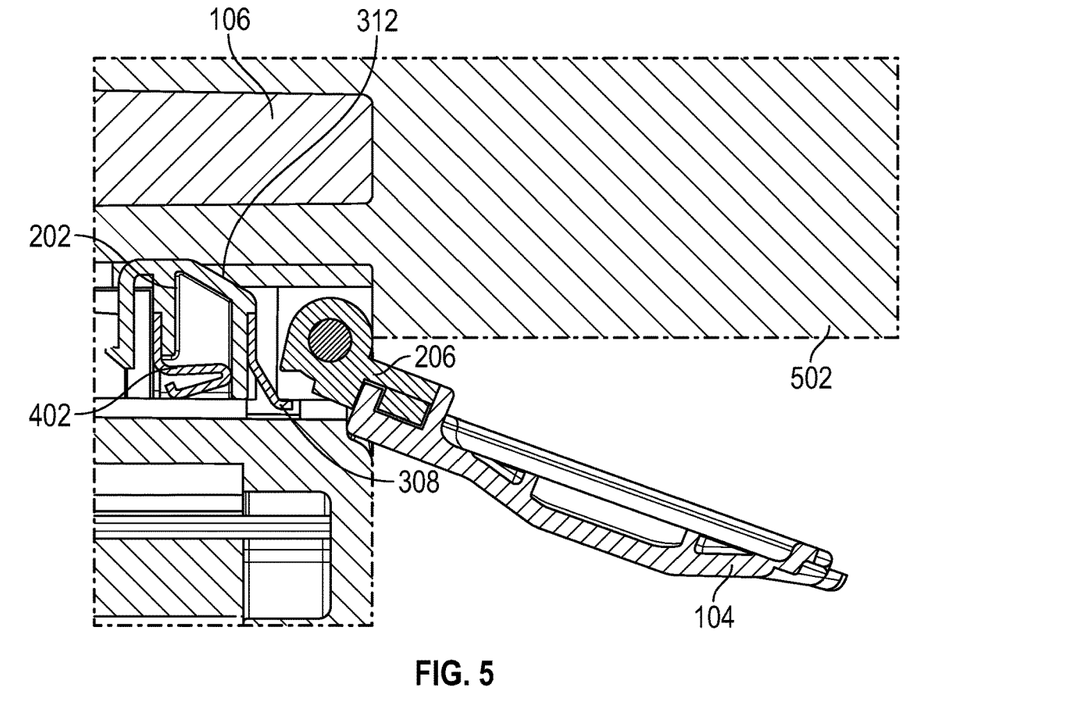
FIG. 5 is a cross-sectional side view of the socket assembly with a plug inserted in the socket.

In a next step, the plug 502 is inserted in the socket assembly 102. FIG. 5 shows a cross-sectional side view of the socket assembly 102 with an inserted plug 502. When the plug 502 is inserted into the socket assembly 102, the plug 502 contacts the tilted surface 312 of the activation pin 202 and there is an overlapping between the plug 502 and the activation pin 202. The activation pin 202 is pushed back by means of the plug 502 such that the activation pin 202 does no longer extend into the channel 404 of the socket assembly 102 that receives the plug 502. If the plug 502 is completely inserted into the socket assembly 102, the activation pin 202 has been shifted from the activation position into the release position. The activation pin 202 pushes the spring hook 308 in the same direction as the activation pin 202 is shifted by means of the plug 502. In the release position of the activation pin 202 the spring hook 308 that locks the flap 104 in the open position releases the flap 104 since the activation pin 202 has moved the spring hook 308 to an extent that the spring hook 308 is disconnected from the connector 206. The flap 104 is no longer hold by the spring hook 308, i.e. the spring hook 308 no longer grabs in the cavity of the connector 206. The flap 104 rotates by means of the biased spring 204 in the direction of the closed position and strikes against an outer wall of the plug 502 which is inserted in the socket assembly 102. The flap 104 rotates about the shaft 212 from the open position in the direction of the closed position to an extend of more than 30%, only if the plug 502 is unplugged from the socket assembly 102. The return spring 402 is compressed or prestressed in the release position of the activation pin 202, as shown in FIG. 5.

Figure 6:
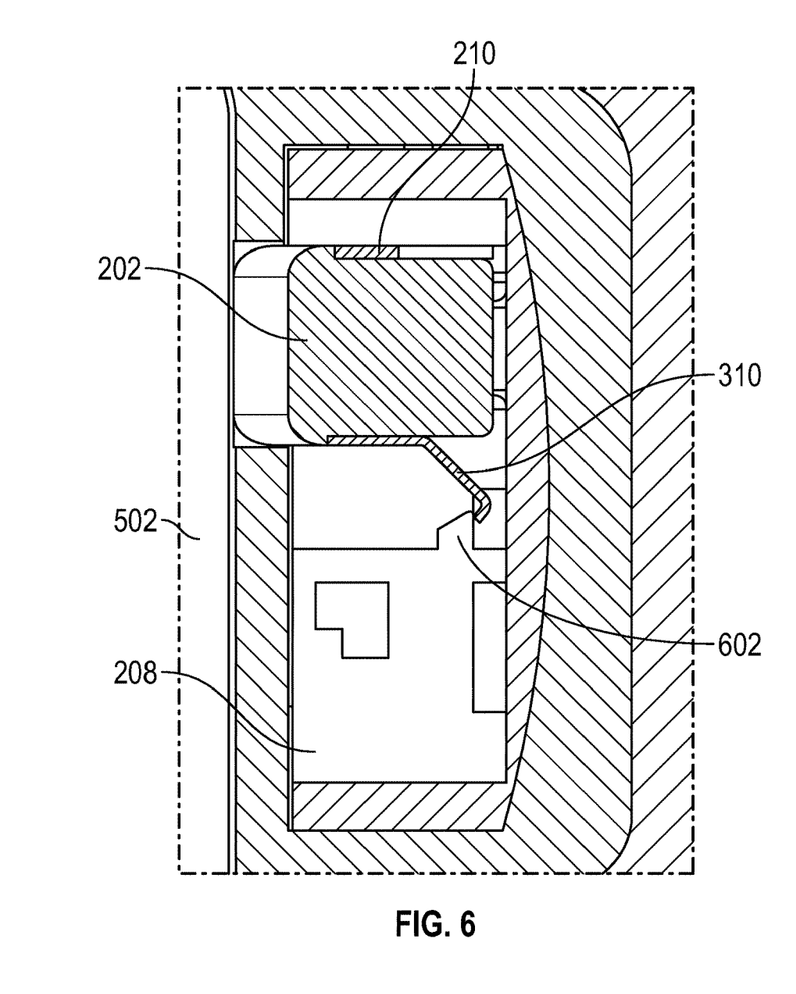
FIG. 6 is a cross-sectional top view of an activation pin in a release position.

FIG. 6 shows a cross-sectional top view of an activation pin 202 in the release position. The plug 502 is inserted in the socket assembly 102 and the plug 502 shifts the activation pin 202 from the activation position into the release position. The activation pin 202 pushes the spring member 210 in the same direction as the activation pin 202 is shifted by the plug 502. If the activation pin 202 is in the release position, the spring hook 310 locks the activation pin 202 in the release position as one end of the spring hook 310 hooks in a clamp 602 of the base member 208. The activation pin 202 is not shiftable any more into the activation position as long as the activation pin 202 is locked in the release position by means of the spring hook 310.

Figure 7:
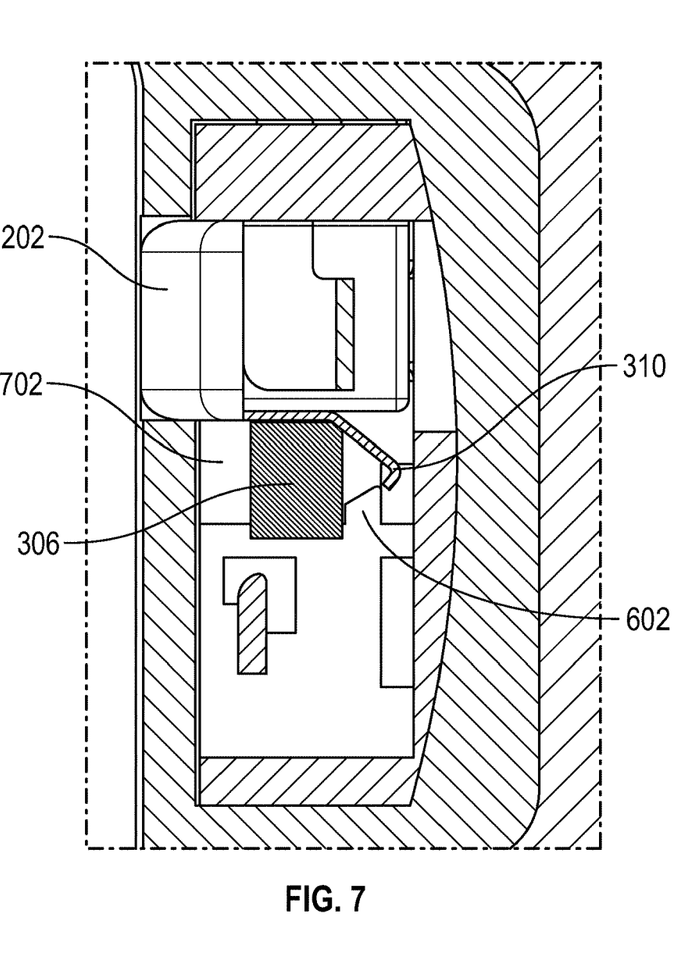
FIG. 7 is a cross-sectional top view of the activation pin, released from the release position by means of a protrusion.

If the plug 502 is unplugged from the socket assembly 102, the flap 104 that was hold by the plug 502 moves into the closed position by means of the spring 204. The activation pin 202 still rests in the release position until the activation pin 202 has been released by the protrusion 306 of the connector 206. FIG. 7 shows a cross-sectional top view of the activation pin 202, that has been released from the release position by means of the protrusion 306. The protrusion 306 releases the spring hook 310 of the activation pin 202 from the release position, if the flap 104 rotates about the shaft 212 from the open position into the closed position. Since the flap 104 and the connector 206 are connected to each other, the connector 206 also rotates about the shaft 212, if the flap 104 rotates about the shaft 212. The protrusion 306 enters a cavity 702 of the base member 208, interferes with the spring hook 310 and pushes back the spring hook 310 as shown in FIG. 7. Thereby, the connection between the spring hook 310 and the clamp 602 is released and the activation pin 202 is unlocked from the release position. This allows the biased return spring 402 to push back the activation pin 202 from the release position into the activation position. If the flap 104 is fully locked, i.e. the flap 104 is in the closed position, the socket assembly 102 returned to its initial position wherein the activation pin 202 is in the activation position.

One additional aspect of the present disclosure is, that the flap 104 and the connector 206 are disconnected if the flap 104 rotates from the closed position to the open position to an extent of e.g. at least 110%, i.e. beyond the open position. The flap 104 and the connector 206 are not damaged due to a disconnection of the flap 104 from the connector 206 such that the flap 104 can be inserted into the connector 206 after the disconnection, and the socket assembly 102 operates as described herein.

Summing up, the functionality of the socket assembly 102 may be described as follows. The socket assembly 102 is in an initial condition if the flap 104 is in the closed position. After opening the flap 104 manually by rotating the flap 104 about a shaft 212, the flap 104 is locked in an open position by means of a spring hook 308. If the user inserts a plug 502 into the socket assembly 102, a tilted surface 312 of an activation pin 202 is contacted by means of the plug 502. The plug 502 pushes the activation pin 202 from an activation position into a release position by sliding over the tilted surface 312 of the activation pin 202. As the activation pin 202 is pushed backward by means of the plug 502, the activation pin 202 itself pushes the spring member 210 in the same direction. Due to the movement of the spring member 210, that comprises the spring hook 308 that locks the flap 104 in the open position of the flap 104, the spring hook 310 that locks the activation pin 202 in its release position, and the return spring 402 that shifts the activation pin 202 from its release position into the activation position, the flap 104 is released from the open position and the flap 104 rotates from the open position in the direction of the closed position by means of the spring 204. The flap 104 strikes the plug 502, that is still inserted in the socket assembly 102. The activation pin 202 is locked in its release position about simultaneously as the flap 104 is released from its open position, since the spring hook 310 is locked in a cavity of the base member 208 if the activation pin 202 has been shifted in its release position by means of the plug 502. After pulling the plug 502 out of the socket assembly 102, the flap 104 rotates about the shaft 212 in its closed position by means of the spring 204. The connector 206 at which the flap 104 is connected, also rotates about the shaft 212. Thereby, a protrusion 306 located on the connector 206 enters a cavity of the base member 208 and releases the activation pin 202 from its release position. The activation pin 202 moves from its release position into the activation position by means of the return spring 402. If the flap 104 is in the closed position and the activation pin 202 is in the activation position, the socket assembly 102 has reached the initial condition again.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. A socket assembly, comprising:
    a socket for receiving a plug,
    a flap for covering the socket, wherein said flap is rotatable about a shaft between a closed position and an open position and is biased into the closed position,
    a locking mechanism that locks the flap in the open position,
    a release mechanism that releases the locking mechanism, when the plug is inserted in the socket,
    wherein after a release of the locking mechanism, the locking mechanism can be activated to lock the flap in the open position again only after the flap has been rotated from the open position to the closed position to an extent of at least 30%.

2. The socket assembly according to claim 1, wherein the release mechanism comprises a shiftable activation pin that releases the locking mechanism when the plug is inserted in the socket, wherein the activation pin is shiftable between an activation position and a release position, wherein the activation pin is in the activation position if the flap has been rotated from the open position to the closed position to an extent of at least 30%, wherein the activation pin is in the release position if the plug is inserted in the socket or the flap has been rotated from the open position to the closed position to an extent of less than 30%.

3. The socket assembly according to claim 2, wherein the activation pin comprises a tilted surface to contact the plug, wherein the tilted surface is contacted by the plug when the plug is inserted in the socket, wherein the activation pin is shifted from the activation position into the release position when the plug is inserted in the socket.

4. A socket assembly, comprising:
    a socket for receiving a plug,
    a flap for covering the socket, wherein said flap is rotatable about a shaft between a closed position and an open position and is biased into the closed position,
    a locking mechanism that locks the flap in the open position,
    a release mechanism that releases the locking mechanism, when the plug is inserted in the socket,
    wherein after a release of the locking mechanism, the locking mechanism can be activated only after the flap has been rotated from the open position to the closed position to an extent of at least 30%,
    wherein the release mechanism comprises a shiftable activation pin that releases the locking mechanism when the plug is inserted in the socket, wherein the activation pin is shiftable between an activation position and a release position, wherein the activation pin is in the activation position if the flap has been rotated from the open position to the closed position to an extent of at least 30%, wherein the activation pin is in the release position if the plug is inserted in the socket or the flap has been rotated from the open position to the closed position to an extent of less than 30%, wherein the release mechanism comprises a spring hook that locks the activation pin in the release position.

5. A socket assembly, comprising:
    a socket for receiving a plug,
    a flap for covering the socket, wherein said flap is rotatable about a shaft between a closed position and an open position and is biased into the closed position,
    a locking mechanism that locks the flap in the open position,
    a release mechanism that releases the locking mechanism, when the plug is inserted in the socket, wherein after a release of the locking mechanism, the locking mechanism can be activated only after the flap has been rotated from the open position to the closed position to an extent of at least 30%, wherein the release mechanism comprises a shiftable activation pin that releases the locking mechanism when the plug is inserted in the socket, wherein the activation pin is shiftable between an activation position and a release position, wherein the activation pin is in the activation position if the flap has been rotated from the open position to the closed position to an extent of at least 30%, wherein the activation pin is in the release position if the plug is inserted in the socket or the flap has been rotated from the open position to the closed position to an extent of less than 30%, wherein the release mechanism comprises a return spring that shifts the activation pin from the release position into the activation position.

6. The socket assembly according to claim 5, wherein the locking mechanism comprises a spring hook that locks the flap in the open position.

7. A socket assembly, comprising:
a socket for receiving a plug,
a flap for covering the socket, wherein said flap is rotatable about a shaft between a closed position and an open position and is biased into the closed position,
a locking mechanism that locks the flap in the open position,
a release mechanism that releases the locking mechanism, when the plug is inserted in the socket,
wherein after a release of the locking mechanism, the locking mechanism can be activated only after the flap has been rotated from the open position to the closed position to an extent of at least 30%, wherein the release mechanism comprises a shiftable activation pin that releases the locking mechanism when the plug is inserted in the socket, wherein the activation pin is shiftable between an activation position and a release position, wherein the activation pin is in the activation position if the flap has been rotated from the open position to the closed position to an extent of at least 30%, wherein the activation pin is in the release position if the plug is inserted in the socket or the flap has been rotated from the open position to the closed position to an extent of less than 30%, further comprising:

a connector accommodating the shaft and comprising a protrusion,
wherein the protrusion releases the activation pin from the release position.

8. The socket assembly according to claim 7, further comprising:
a base member,
wherein the base member accommodates the connector, the locking mechanism and the release mechanism, and wherein the base member is snap-fit in the socket.

9. The socket assembly according to claim 8, wherein the connector couples the flap and the base member by means of the shaft.

10. The socket assembly according to claim 6, further comprising:
a spring member,
wherein the spring member comprises the spring hook that locks the flap in the open position, the spring hook that locks the activation pin in the release position, and the return spring, wherein the spring member is of a cuboid structure, wherein the spring hooks and the return spring are dedicated to respectively one side of the cuboid structure.

11. The socket assembly according to claim 10, wherein the spring member encloses the activation pin.

12. The socket assembly according to claim 7, wherein the flap and the connector are releasably connected.

13. The socket assembly according to claim 12, wherein the flap and the connector are disconnected if the flap has been rotated from the closed position to the open position to an extent of at least 110%.

14. The socket assembly according to claim 1, wherein the locking mechanism can be activated only after the flap has been rotated from the open position to the closed position to an extent of at least 50%.

15. The socket assembly according to claim 14, wherein the locking mechanism can be activated only after the flap has been rotated from the open position to the closed position to an extent of at least 75%.

16. The socket assembly according to claim 15, wherein the locking mechanism can be activated only after the flap has been rotated from the open position to the closed position to an extent of at least 90%.

* * * * *